D. TREADWELL.
Muzzle-Loading Ordnance.
No. 13,927.
Patented Dec. 11, 1855.
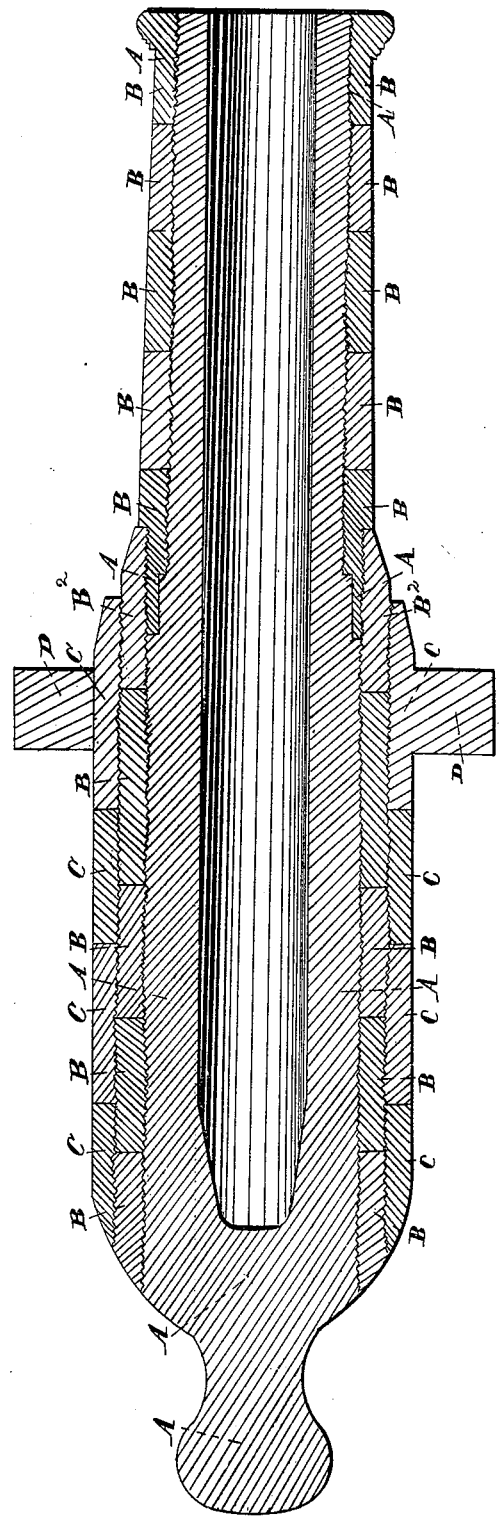
Witnesses
W Bennet
Inventor
Dan'l Treadwell

UNITED STATES PATENT OFFICE.

DANIEL TREADWELL, OF LONDON, ENGLAND.

IMPROVED MANUFACTURE OF CANNON.

Specification forming part of Letters Patent No. 13,927, dated December 11, 1855.

*To all whom it may concern:*

Be it known that I, DANIEL TREADWELL, engineer, a citizen of the United States of America, but now residing in London, England, have invented a new and useful Improvement in Making Cannon; and I hereby declare the following to be a true description and specification of my said improvement, to wit:

I first cast a cannon in the usual manner, but having in its largest part a diameter only about twice as great as the caliber intended to be bored in it. I then bore it and turn the outside, making two or three cylinders, as represented at A A in the drawing hereto annexed, one of these cylinders, extending from the breech to a little beyond the trunnions, being somewhat larger than the others, that extend from near the trunnions to the muzzle. Upon these cylinders I cut a screw, formed of about eight threads, each thread taking about an eighth of an inch space, so that one turn advances each thread about an inch. I then form several hoops or rings of wrought-iron, (represented at B B B, &c. in section.) These hoops are turned upon the inside, and have a female screw cut upon their inner surface, to fit the threads before described as cut upon the cast-iron cylinders forming the gun-body. They are to be finished, however, about one one-thousandth ($\frac{1}{1000}$) part of their internal diameter less in diameter than the male screw that they are to encircle. They are then heated, to expand them sufficiently to turn them onto their place or places, as shown in the drawing. It will be seen that the hoop marked B' must be first put in its place, and a portion of its outer side turned, and have the threads formed upon it before the hoop B², that partly covers it, can be put in its place. When one cover of hoops B B B, &c., is arranged as herein described and shown, I place the gun again in the lathe and turn the outside of these first series of hoops, and cut thereon a screw formed of several threads, as was before done upon the cast-iron body. (This may be done upon all, or only, as shown in the figure, upon those from the breech to the trunnions inclusive.) I then form another set of hoops, C C C &c., with female screws corresponding to the male screws upon the first series, and the diameter being one one-thousandth part less than the screw they are to cover, I expand them by heat, as was practiced with the first set, and let them shrink on in place as they are shown in the drawing. One of these hoops has the trunnions forged upon it, as shown at D D. It will be noticed that the series C C break joint over B B.

The drawing is a section of the cannon made through its axis, and the several parts cannot fail to be at once known and understood. The proportions in this drawing are intended for a cannon of twelve inches caliber.

I do not claim a patent for using hoops generally in making cannon, as the earliest cannon known were formed, in part, by hoops brazed upon them; but my invention consists in—

Constructing cannon with hoops screwed and shrunk upon a body in which the caliber is formed in the manner herein described.

In witness of all which I have hereto set my hand this 19th day of June, 1855, at London.

DANL. TREADWELL.

In presence of—
JOHN R. DAKER,
WILLIAM EWING.